US010739666B2

(12) United States Patent
Hwang et al.

(10) Patent No.: US 10,739,666 B2
(45) Date of Patent: Aug. 11, 2020

(54) SHIELDING DEVICE

(71) Applicant: KOREA INSTITUTE OF SCIENCE AND TECHNOLOGY, Seoul (KR)

(72) Inventors: Donghyun Hwang, Seoul (KR); Doik Kim, Seoul (KR); Junsik Kim, Seoul (KR); Youngsu Cha, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 261 days.

(21) Appl. No.: 15/985,931

(22) Filed: May 22, 2018

(65) Prior Publication Data
US 2019/0121219 A1   Apr. 25, 2019

(30) Foreign Application Priority Data

Oct. 19, 2017   (KR) .................. 10-2017-0135716

(51) Int. Cl.
| G03B 17/02 | (2006.01) |
| G01D 11/24 | (2006.01) |
| G03B 11/04 | (2006.01) |
| G03B 9/06 | (2006.01) |

(52) U.S. Cl.
CPC ........... *G03B 17/02* (2013.01); *G01D 11/245* (2013.01); *G03B 11/043* (2013.01); *G03B 9/06* (2013.01)

(58) Field of Classification Search
CPC ........ G03B 17/02; G03B 11/043; G03B 9/06; G01D 11/245; A62C 99/009
USPC ..... 348/56, 194, 195, 740, E5.028; 396/226, 396/355, 452, 471, 495
See application file for complete search history.

(56) References Cited

U.S. PATENT DOCUMENTS

| 2001/0026687 A1* | 10/2001 | Kosaka .................... G03B 9/08 396/452 |
| 2003/0079472 A1* | 5/2003 | Hara ....................... F03G 7/065 60/527 |
| 2006/0255275 A1* | 11/2006 | Garman ................. H04N 5/238 250/338.1 |
| 2008/0247748 A1* | 10/2008 | Tanimura ................. G03B 3/10 396/502 |
| 2010/0283887 A1* | 11/2010 | Topliss .................... F03G 7/065 348/345 |

(Continued)

FOREIGN PATENT DOCUMENTS

| JP | 09-229208 A | 9/1997 |
| JP | 2013-217625 A | 10/2013 |

(Continued)

*Primary Examiner* — Randy W Gibson
*Assistant Examiner* — Gedeon M Kidanu
(74) *Attorney, Agent, or Firm* — Rabin & Berdo, P.C.

(57) ABSTRACT

Disclosed is a shielding device, which includes: a casing having an open portion; a deformable unit installed at the casing and configured to be deformed in one direction at a predetermined temperature; a power transmission unit connected to the deformable unit to transmit a power generated by the deformation of the deformable unit; and a shielding unit installed at the casing and connected to the power transmission unit to receive the power from the power transmission unit, the shielding unit being configured to open or close the open portion, wherein the deformable unit is deformed at a first temperature to be expanded or compressed, and the shielding unit closes the open portion by means of the deformation of the deformable unit.

12 Claims, 11 Drawing Sheets

(56) References Cited

U.S. PATENT DOCUMENTS

2011/0179786 A1* 7/2011 Topliss ................... F03G 7/065
  60/527
2013/0121681 A1* 5/2013 Lee ...................... H04N 5/2254
  396/508

FOREIGN PATENT DOCUMENTS

| KR | 20-0263470 Y1 | 2/2002 |
| KR | 10-0451655 B1 | 10/2004 |
| KR | 10-0632375 B1 | 10/2006 |
| KR | 10-0686325 B1 | 2/2007 |
| KR | 10-2009-0090592 A | 8/2009 |
| KR | 10-1173307 B1 | 8/2012 |
| KR | 10-1459966 B1 | 11/2014 |
| KR | 10-1559862 B1 | 10/2015 |
| KR | 10-2016-0023506 A | 3/2016 |

* cited by examiner

SHIELDING DEVICE

CROSS-REFERENCE TO RELATED APPLICATION

This application claims priority to Korean Patent Application No. 10-2017-0135716, filed on Oct. 19, 2017, and all the benefits accruing therefrom under 35 U.S.C. § 119, the contents of which in its entirety are herein incorporated by reference.

BACKGROUND

1. Field

The present disclosure relates to a shielding device, and more particularly, to a shielding device for automatically shielding a sensor module against high temperature at a high temperature situation such as a fire.

EXPLANATION ON NATIONAL RESEARCH AND DEVELOPMENT SUPPORT

This research is led by JINWOO SMC and supported by the system industry future growth engine business of the Korea Industrial Technology Evaluation and Management Agency, the Ministry of Commerce, Industry and Energy, the Republic of Korea (Development of Armored Robot System to Support Life Protection and Emergency Work of Indoor Entrants at Complex Disaster Accident Site, Project No. 1415151321).

2. Description of the Related Art

A fire-fighting armored vehicle that is deployed inside the scene of fire is equipped with sensor modules in which various sensors such as a vision camera, a temperature sensor, and radar for fire environment monitoring are collected.

In high temperature environments such as fires, the sensor modules are susceptible to breakage, and thus it is required to develop devices for preventing the sensors from being damaged.

Meanwhile, there have been disclosed devices using shape memory alloys to be utilized in the scene of fire, and most of the devices use the shape memory effect of the shape memory alloy. Examples of such devices include a device whose shape memory alloy is activated according to a rising temperature in a fire to simply detect a fire, a device for cutting off an electric power of an electronic device, a device for opening a door lock of a door, a device for intercepting the supply of gas, and the like.

The devices using a shape memory alloy are characterized in that the shape memory effect of the shape memory alloy is used just once during a fire.

Thus, it is required to develop a device in which a shutter is repeatedly opened and closed depending on whether the shape memory alloy is activated, rather than being used just once. In addition, it is required to develop a shutter for protecting the sensor modules mounted at the equipment deployed into the scene of fire from high temperature and a device for effectively driving the shutter.

Meanwhile, in regard to the application of a shape memory alloy actuator, it is required to develop a device capable of implementing a driving unit without a separate power supply device and a control device.

RELATED LITERATURES

Patent Literature

KR Patent No. 10-0451655 (entitled "a fire detecting device including a reserve battery, issued on Oct. 8, 2004)

SUMMARY

The present disclosure is directed to providing a shielding device that is capable of protecting sensor modules mounted to the equipment deployed into the scene of fire.

In one aspect, there is provided a shielding device, comprising: a casing having an open portion; a deformable unit installed at the casing and configured to be deformed in one direction at a predetermined temperature; a power transmission unit connected to the deformable unit to transmit a power generated by the deformation of the deformable unit; and a shielding unit installed at the casing and connected to the power transmission unit to receive the power from the power transmission unit, the shielding unit being configured to open or close the open portion, wherein the deformable unit is deformed at a first temperature to be expanded or compressed, and the shielding unit closes the open portion by means of the deformation of the deformable unit.

In an embodiment of the present disclosure, the shielding unit may include: a shielding pivot unit connected to the power transmission unit and having a plurality of slot holes spaced apart from each other in a circumferential direction and formed in directions intersecting with each other; and a shielding shutter having a plurality of protrusions guided by the slot holes by means of the rotation of the shielding pivot unit and allowing the open portion to be opened or closed.

The slot holes may have an arc shape.

The shielding shutter may be provided in plural to be disposed along a circumferential direction, each of the shielding shutters may have the protrusion, respectively, and in a state where the protrusions are guided by the plurality of slot holes, the plurality of shielding shutters may be guided and moved by adjacent shielding shutters to close the open portion.

The power transmission unit may include a first gear unit rotatably installed at one surface of the casing and disposed to intersect with the shielding pivot unit, the shielding pivot unit may include a second gear unit formed along a circumferential direction to protrude at an edge of one surface thereof and engaged with the first gear unit, and the first gear unit may transmit the power generated by the deformation of the deformable unit to the second gear unit so that the shielding pivot unit rotates.

The power transmission unit may further include a rotator connected to the first gear unit to be pivotal together with the first gear unit and coupled to the deformable unit at one end thereof to rotate by means of the deformation of the deformable unit.

The first gear unit and the rotator may rotate based on the same rotary shaft.

An elastic member may be installed at the other end of the rotator.

In another embodiment of the present disclosure, the deformable unit may be a shape memory alloy.

The shielding unit may further include a shutter guide disposed between the shielding shutter and the casing to guide the shielding shutter so that the shielding shutter opens or closes the open portion.

The shutter guide may have a plurality of guide grooves disposed to be inclined at a predetermined angle and spaced apart from each other along a circumferential direction, the shielding shutter may include a guide rib inserted into the guide groove to be guided thereby, and the shielding shutter may close the open portion as the guide rib is guided in the guide groove.

In another embodiment of the present disclosure, the deformable unit may be deformed to be expanded at the first temperature, and the deformable unit may be deformed to be compressed at a second temperature lower than the first temperature, and the open portion may be closed by means of the power generated when the deformable unit is compressed.

DETAILED DESCRIPTION

Hereinafter, the embodiments disclosed in this specification will be described in detail. Here, identical or similar components are denoted by identical or similar reference symbols and not described in detail again. In the following description, the word "unit" used in terms is selected or endowed only in consideration of ease naming and does not have any distinguishable meaning or role. In addition, in the following description of the embodiments of the present disclosure, any detailed description of related arts can be omitted if it is determined that the gist of the embodiments disclosed herein can be obscured by the same. Moreover, it should be understood that the accompanying drawings are just for better understanding of the embodiments disclosed herein and are not to be construed as limiting the scope of the present disclosure. The scope of the present disclosure should be understood as including all changes, equivalents and alternatives thereof.

Terms having an ordinal such as "first" and "second" can be used for explaining various components, but the components are not limited by the terms. These terms are just used for distinguishing any component from another.

In case it is mentioned that any component is "connected" to another component, the component may be connected directly to another component, but it should be understood that any other component can be further interposed between them.

The singular expressions are intended to include the plural forms as well, unless the context clearly indicates otherwise.

In this specification, the term such as "include" and "have" is just to specify the presence of features, integers, steps, operations, elements, parts or components thereof, stated in the specification, but does not preclude the presence or addition of one or more other features, integers, steps, operations, elements, parts or components thereof.

A shielding device 100 of the present disclosure, described below, may be operated in a high temperature situation, such as in a fire environment. Also, the shielding device 100 of the present disclosure may be a shutter driving device for protecting a sensor module.

The shielding device 100 of the present disclosure includes a casing 40, a deformable unit 10, a power transmission unit 20 and a shielding unit 30.

The casing 40 has an open portion 42. The casing 40 may also include a sensor module installation region 44 therein, and a sensor module 46 where various sensors are aggregated may be installed in the sensor module installation region 44. The sensor module 46 may include a vision camera, a temperature sensor, a radar and the like for monitoring a fire environment.

In other words, the casing 40 of the present disclosure may be understood as, for example, a configuration installed in a fire fighting vehicle deployed into a fire scene and capable of accommodating the sensor module 46.

Figure 1A:
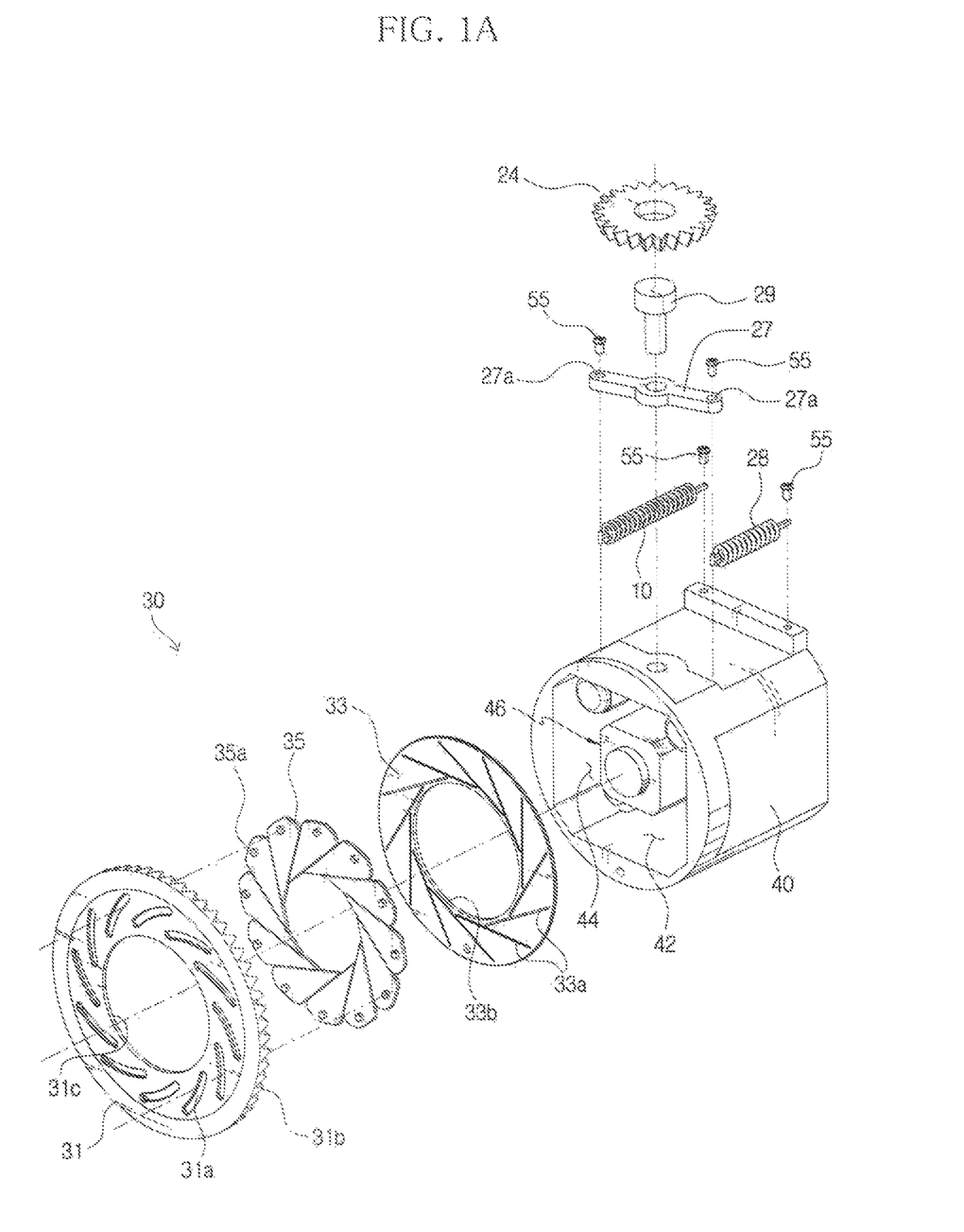
FIG. 1A is an exploded perspective view showing an example of a shielding device according to the present disclosure.
Figure 1B:
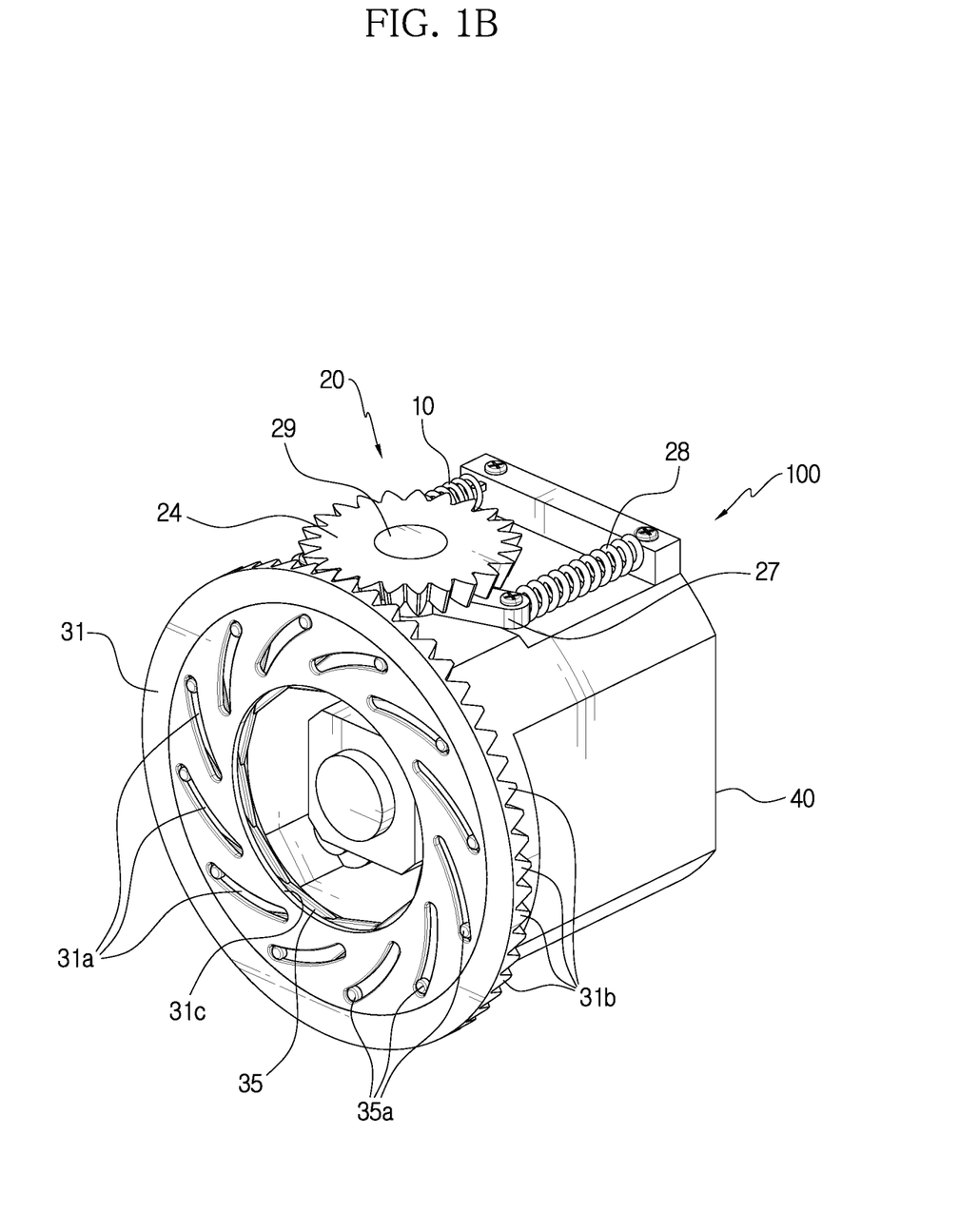
FIG. 1B is a perspective showing an example of the shielding device according to the present disclosure.

FIGS. 1A and 1B show an example in which the sensor module installation region 44 is provided inside the casing 40, and the sensor module 46 is installed therein. In a normal state, the open portion 42 is opened, so that the sensor module 46 operates. In a high temperature state, the open portion 42 is closed by the shielding unit 30, explained later, to block the radiant heat to the sensor module installation region 44, thereby preventing the sensor module 46 from being damaged or broken due to the radiant heat.

Figure 2:
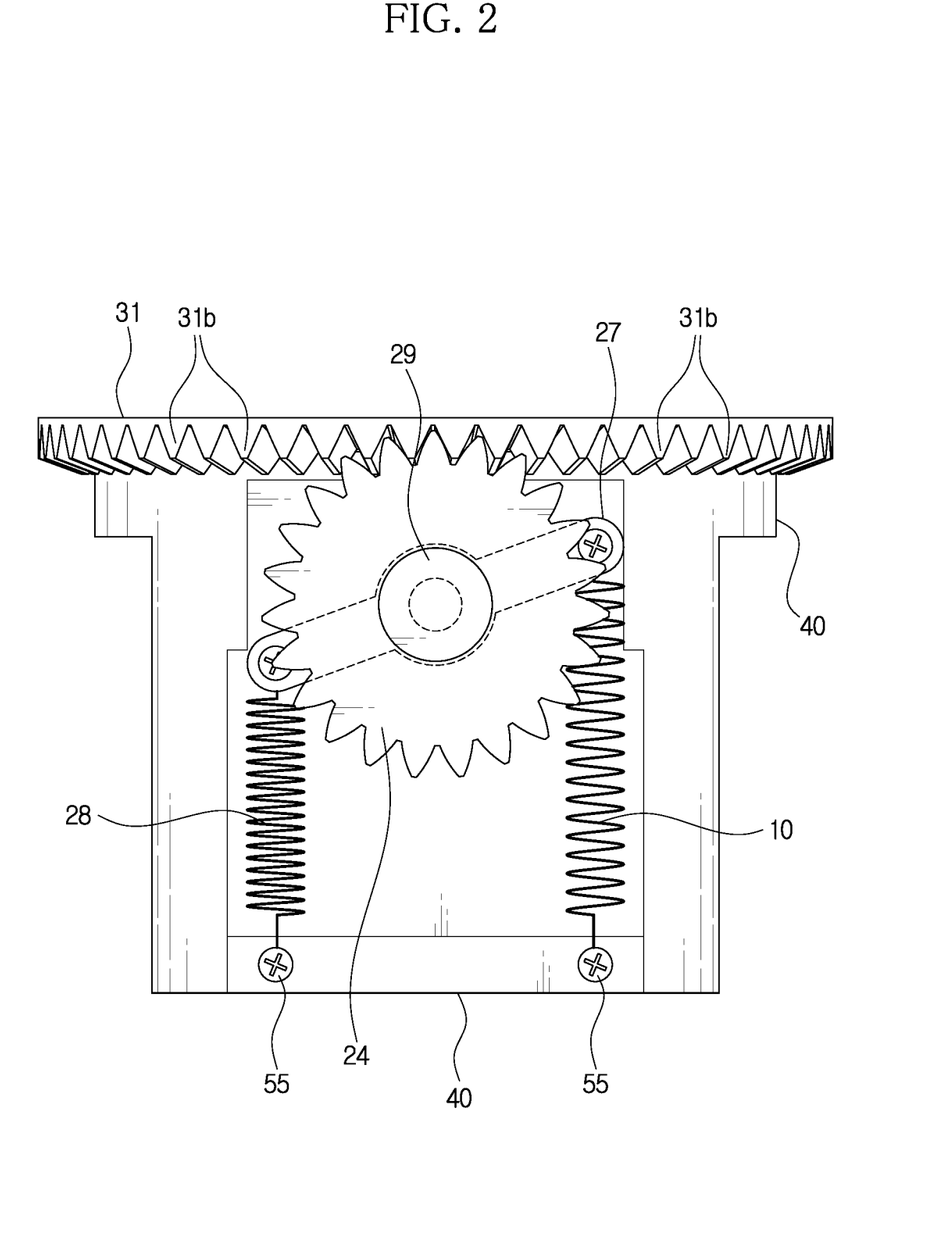
FIG. 2 is a diagram of FIG. 1B, observed from the above.

The deformable unit 10 is configured to be deformed in one direction at a predetermined temperature. Power is generated due to the deformation of the deformable unit 10, and the power is transmitted to the shielding unit 30 through the power transmission unit 20, explained later, to block the open portion 42 of the casing 40. In the present disclosure, the deformable unit 10 may be, for example, a shape memory alloy (SMA) or a shape memory alloy actuator. In FIGS. 1A to 2, an example of the deformable unit 10 that is rolled several times like a coil or a spring is depicted. However, the shape of the deformable unit is not limited to the shape of a coil or a spring.

If the deformable unit 10 is a shape memory alloy or a shape memory alloy actuator, in the present disclosure, at a first temperature that is a high temperature, the deformable unit 10 may be compressed so that the open portion 42 is closed by the shielding unit 30, and at a second temperature that is a low temperature, the deformable unit 10 may be expanded so that the open portion 42 is opened by the shielding unit 30. For example, the deformable unit 10 may start being compressed at a temperature lower than the first temperature and be maximally compressed at the first temperature so that the shielding unit 30 closes the open portion 42. Also, the deformable unit 10 may be deformed to be expanded at a temperature higher than the second temperature so that the shielding unit 30 is opened.

However, the operation of the deformable unit 10 is not limited thereto. That is, it is also possible that the deformable unit 10 is expanded at the first temperature so that the shielding unit 30 closes the open portion 42 and is compressed at the second temperature so that the shielding unit 30 opens the open portion 42.

The power transmission unit 20 may be connected to the deformable unit 10 so that the power generated by the deformation of the deformable unit 10 is transmitted to the shielding unit 30.

The power transmission unit 20 may include a first gear unit 24. The first gear unit 24 may be rotatably mounted at one side of the casing 40 and be disposed to intersect with the shielding pivot unit 31. The first gear unit 24 may be disposed to engage with a second gear unit 31b of the shielding pivot unit 31, explained later, so that the power generated by the deformation of the deformable unit 10 is transmitted to the second gear unit 31b to rotate the shielding pivot unit 31. FIG. 1A shows an example of the first gear unit 24 whose gear teeth are protruded from the outer periphery to the side.

The power transmission unit 20 may further include a rotator 27. The rotator 27 is coupled to the first gear unit 24 to rotate together with the first gear unit 24. The deformable unit 10 is coupled to one end of the rotator 27. Due to the deformation of the deformable unit 10, the rotator 27 rotates together with the first gear unit 24 to transmit the power to the second gear unit 31b.

The rotary shafts of the first gear unit 24 and the rotator 27 may be coaxially arranged. In addition, an elastic member 28 may be provided at the other end of the rotator 27. The elastic member 28 may be a spring or a bias spring.

Referring to FIGS. 1A and 1B, the rotator 27 is installed at the upper surface of the casing 40, and the first gear unit 24 is installed above the rotator 27. In addition, there is shown an example in which one sides of the deformable unit 10 and the elastic member 28 are respectively installed in holes 27a at both ends of the rotator 27 by means of bolts 55. There is also shown an example in which the other sides of the deformable unit 10 and the elastic member 28 are installed in coupling holes 48 of the casing 40 by bolts 55.

However, without being limited to the configuration of FIGS. 1A and 1B, it is also possible that at least one of the deformable unit 10 and the elastic member 28 is directly connected to the first gear unit 24, other than the rotator 27, or that only the deformable unit 10 is connected directly to the rotator 27 or the first gear unit 24 without the elastic member 28.

In addition, FIGS. 1A to 2 show an example where one end of the deformable unit 10 is installed at the rotator 27 and the other end thereof is fixed to the casing 40, and also one end of the elastic member 28 is installed at the rotator 27 and the other end thereof is fixed to the casing 40.

Meanwhile, FIG. 1A shows a rotary shaft 29 installed at the casing 40 such that the first gear unit 24 and the rotator 27 are coaxially rotatable.

The shielding unit 30 is installed at the casing 40. For example, as shown in FIGS. 1A and 1B, the shielding unit 30 may be installed at the front surface of the casing 40 where the open portion 42 is formed. In addition, the shielding unit 30 is connected to the power transmission unit 20 and receives the power from the power transmission unit 20 to close the open portion 42.

The shielding unit 30 may include a shielding pivot unit 31 and a shielding shutter 35.

The shielding pivot unit 31 is rotatably connected to the first gear unit 24. For example, the shielding pivot unit 31 may be connected to the first gear unit 24 and connected to the deformable unit 10 so that the deformable unit 10 is coupled to the rotator 27. In addition, the shielding pivot unit 31 has a plurality of slot holes 31a. The plurality of slot holes 31a may be spaced apart from each other in a circumferential direction of the shielding pivot unit 31 and the plurality of slot holes 31a may be formed in a direction intersecting with each other. Further, the slot holes 31a may be formed in an arc shape.

In addition, the shielding pivot unit 31 includes the second gear unit 31b protruding along a circumferential direction at an edge of one surface of the shielding pivot unit 31. The second gear unit 31b is disposed to be engaged with the first gear unit 24. The power generated by the deformation of the deformable unit 10 may be transmitted from the first gear unit 24 by the second gear unit 31b so that the shielding pivot unit 31 is pivoted. In FIGS. 1A and 1B, the second gear unit 31b protrudes along the circumferential direction from one surface of the shielding pivot unit 31 facing the casing 40. In addition, an example in which the first gear unit 24 and the shielding pivot unit 31 are arranged in an ']' form to intersect with each other is shown in FIG. 1B.

Meanwhile, the shielding pivot unit 31 is preferably formed to correspond to the open portion 42 for the operation of the sensor module 46 when the shielding shutter 35, explained later, is opened.

Referring to FIGS. 1A and 1B, there is shown an example of the shielding pivot unit 31 having a circular opening 31c, in which twelve slot holes 31a are formed to be spaced from each other along a circumferential direction.

The shielding shutter 35 has a protrusion 35a. The protrusion 35a is guided by the slot hole 31a so that the shielding shutter 35 opens and closes the open portion 42 when the shielding pivot unit 31 receives the power generated by the deformable unit 10 and rotates.

The shielding shutters 35 may be provided in plural to be disposed along the circumferential direction. In this case, the protrusion 35a is provided in each of the shielding shutters 35 as shown in FIG. 1A. In addition, FIG. 1B shows an example in which the protrusion 35a is guided by the slot hole 31a.

In a state where the protrusion 35a is guided by the slot hole 31a, the plurality of shielding shutters 35 are guided by neighboring shielding shutters 35 and move to the inside of the shielding pivot unit 31 to close the open portion 42.

The shielding unit 30 may further include a shutter guide 33. The shutter guide 33 is disposed between the shielding shutter 35 and the casing 40 and guides the shielding shutter 35 so that the shielding shutter 35 opens or closes the open portion 42. For example, the shutter guide 33 is fixed at the front of the casing 40, and when the shielding shutter 35 is guided by the rotation of the shielding pivot unit 31, the shielding shutter 35 is also guided by the shutter guide 33.

Figure 3A:
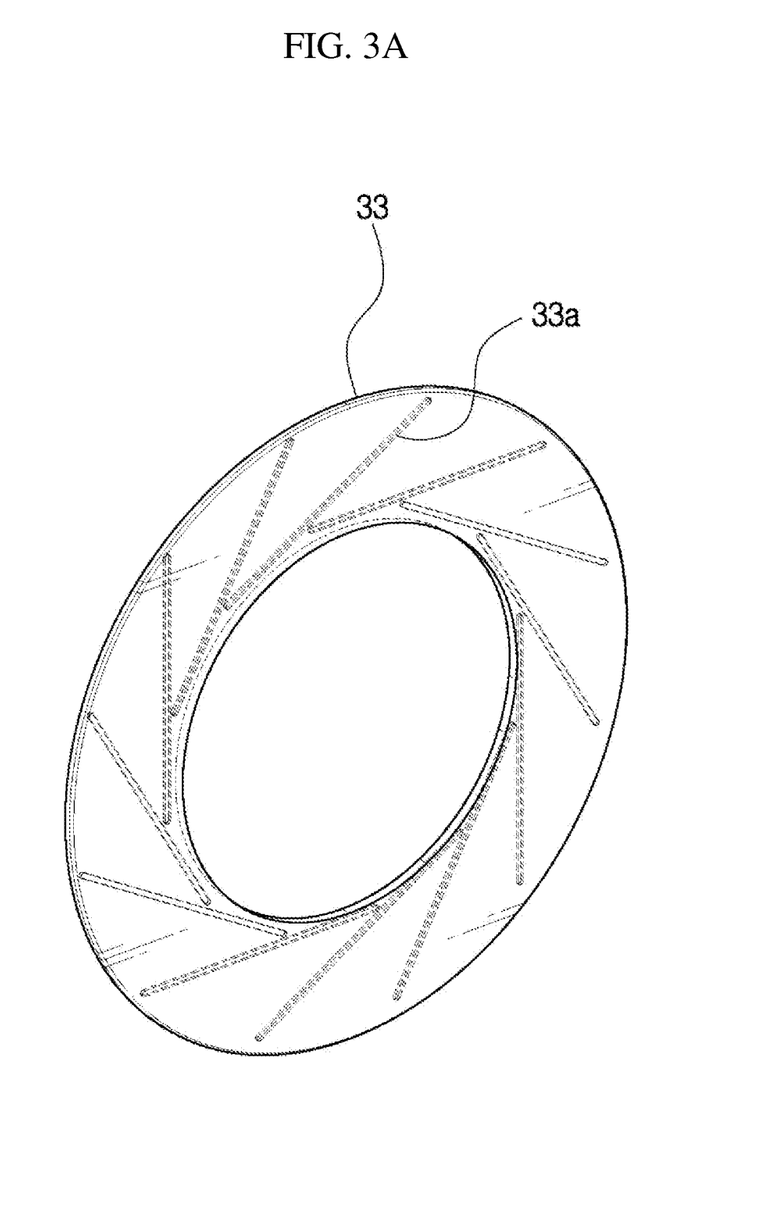
FIG. 3A is a perspective view showing a shutter guide, observed from a rear side.
Figure 3B:
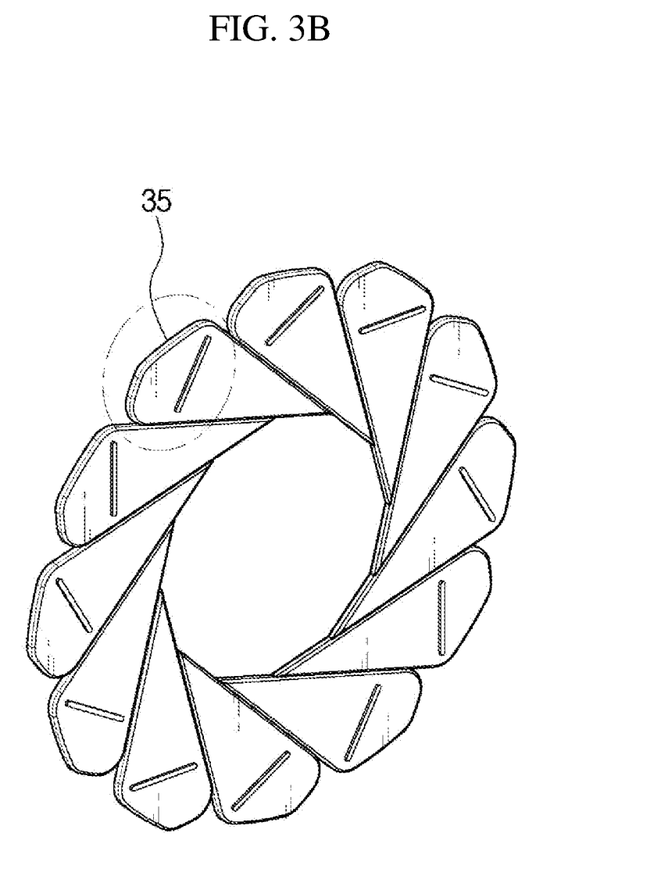
FIG. 3B is a perspective view showing a shielding unit, observed from a rear side.
Figure 3C:
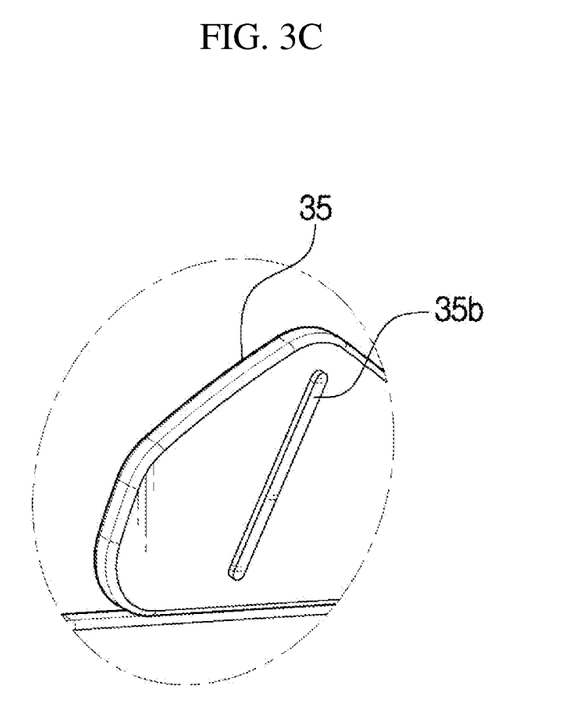
FIG. 3C is an enlarged view showing a portion of a shielding unit, observed from a rear side.

As an example corresponding to the open portion 42, the shutter guide 33 may have a circular opening 33b. In addition, a guide groove 33a corresponding to the movement of each shielding shutter 35 may be formed in the shutter guide 33. The guide groove 33a may be formed in plural in the shutter guide 33, and the plurality of guide grooves 33a may be spaced from each other along a circumferential direction and disposed to be inclined at a predetermined angle. FIGS. 1A and 3A show an example where twelve guide grooves 33a are formed, and the guide grooves 33a may be formed from a point at an edge of the shutter guide 33 to a point located close to the opening 33b.

Meanwhile, a guide rib 35b that may be inserted into the guide groove 33a may be formed at the shielding shutter 35. If the guide rib 35b is located at an outermost side of the guide groove 33a, each shielding shutter 35 is disposed to open the open portion 42 of the casing 40, and if the guide rib 35b is located at an innermost side of the guide groove 33a, each shielding shutter 35 is disposed to close the open portion 42 of the casing 40.

Hereinafter, with reference to FIGS. 4A to 6, the operation of the shielding device in states where the shielding device of the present disclosure is opened, closed about half and entirely closed and the degree of deformation of the deformable unit 10 according to temperature in each state will be described in more detail.

Figure 4A:
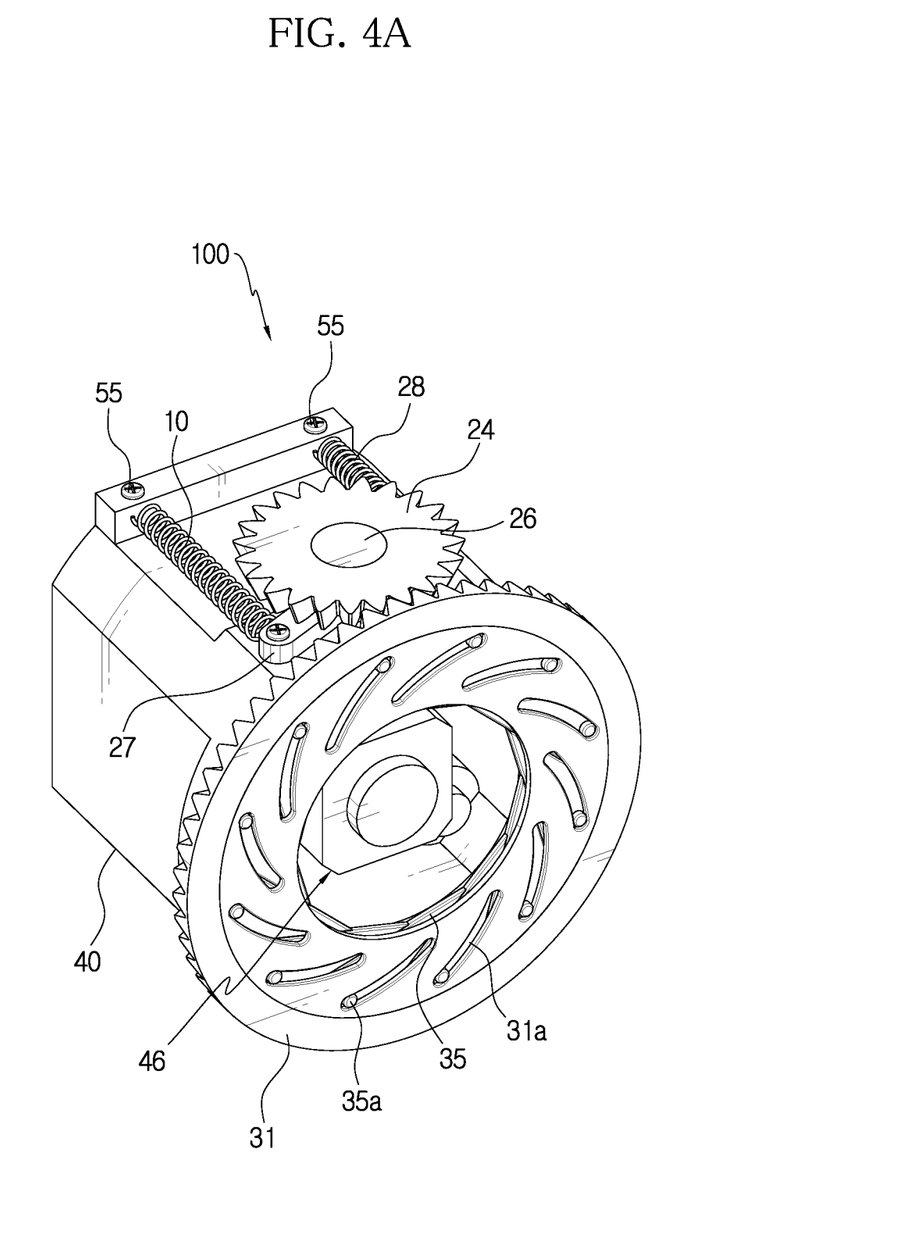
FIG. 4A is a diagram showing an example where the shielding shutter is disposed at an outermost side so that the open portion is entirely opened.

FIG. 4A shows a state where the shielding device 100 of the present disclosure is fully opened. This state may be a state where the deformable unit 10 is not deformed since a fire or the like does not occur, for example.

The state where the shielding device 100 is completely opened is a state where the deformable unit 10 is not deformed, and the elastic member 28 is in a compressed state. At this time, as shown in FIG. 4A, each protrusion 35a is disposed at the outermost side of the slot hole 31a, and, though not shown in FIG. 4A, each guide rib 35b is disposed at the outermost side of the shutter guide 33 so that each shielding shutter 35 is disposed at the outermost side of the shielding pivot unit 31.

Figure 4B:
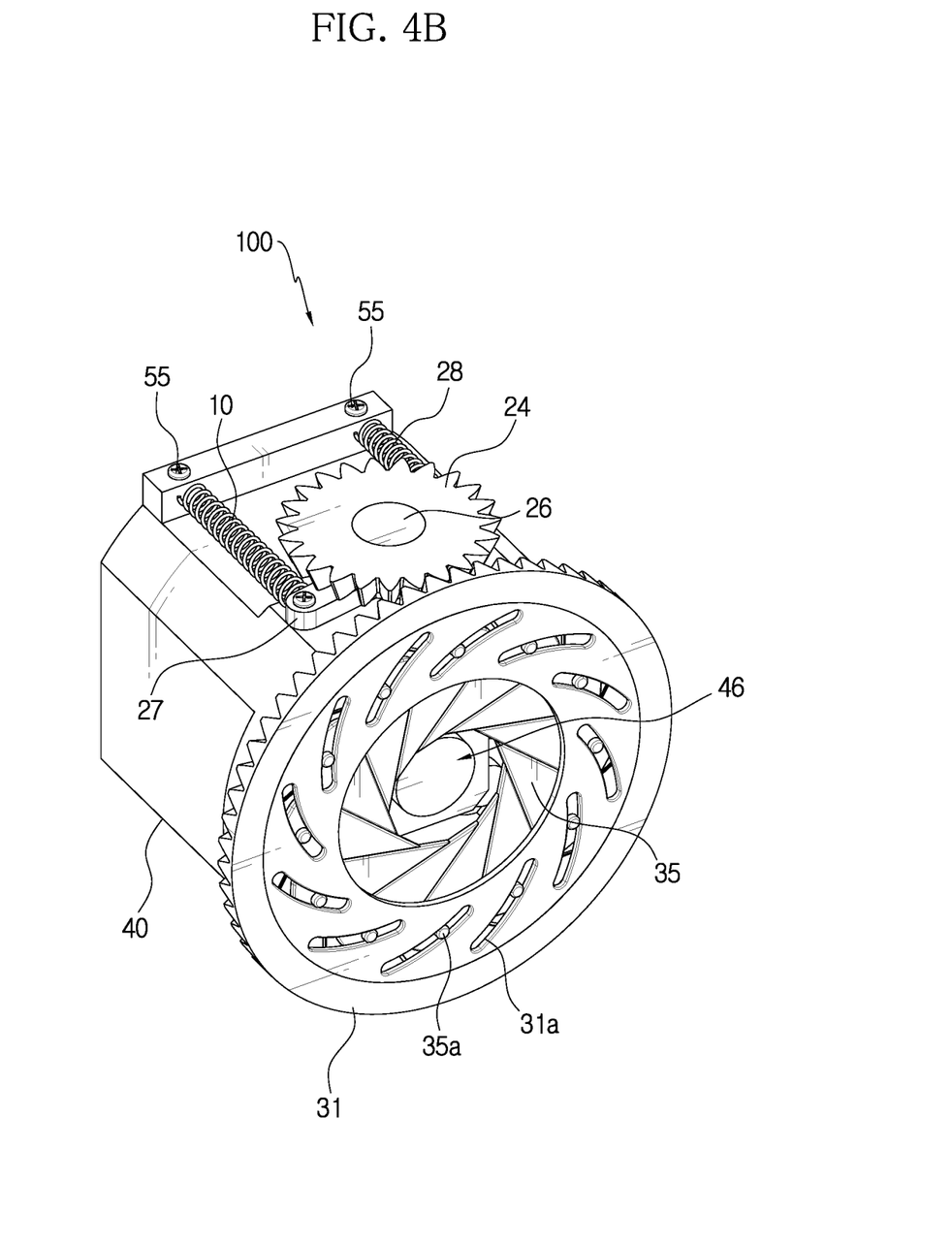
FIG. 4B is a diagram showing an example where the open portion is opened about half.

FIG. 4B shows a state where the shielding device 100 of the present disclosure is closed about half. In this state, for example, the deformable unit 10 is partially deformed or is being deformed since a fire or the like occurs, for example, and the elastic member 28 is in a slightly elongated state.

In the state where the open portion 42 is closed about half by the shielding device 100, as shown in FIG. 4B, each protrusion 35a is disposed between the outermost and innermost sides of the slot hole 31a, and, though not shown in FIG. 4B, each guide rib 35b is disposed between the outermost side and the innermost side of the shutter guide 33 so that each shielding shutter 35 closes the open portion 42 about half.

Figure 4C:
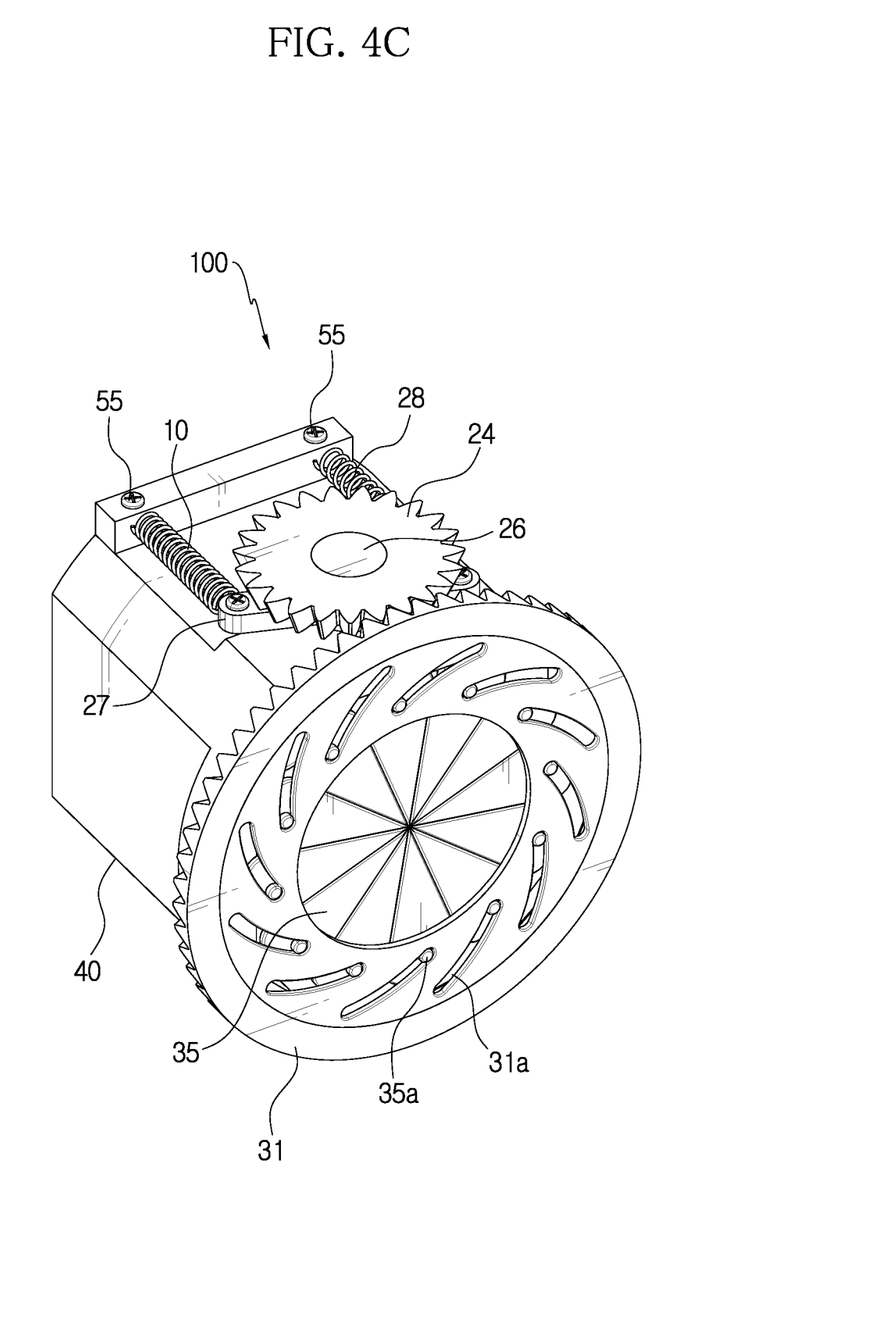
FIG. 4C is a diagram showing an example where the shielding shutter is disposed at an innermost side so that the open portion is entirely closed.

FIG. 4C shows a state where the shielding device 100 of the present disclosure is entirely closed. In this state, for example, a high temperature is delivered to the shielding device 100 since a fire or the like occurs, so that the deformable unit 10 is deformed to be compressed to the maximum, and the elastic member 28 is also elongated to the maximum.

In the state where the open portion 42 is completely closed by the shielding device 100, as shown in FIG. 4C, each protrusion 35a is disposed at the innermost side of the slot hole 31a, and, through not shown in FIG. 4C, each guide rib 35b is disposed at the innermost side of the shutter guide 33, so that each shielding shutter 35 completely closes the open portion 42.

Figure 5:
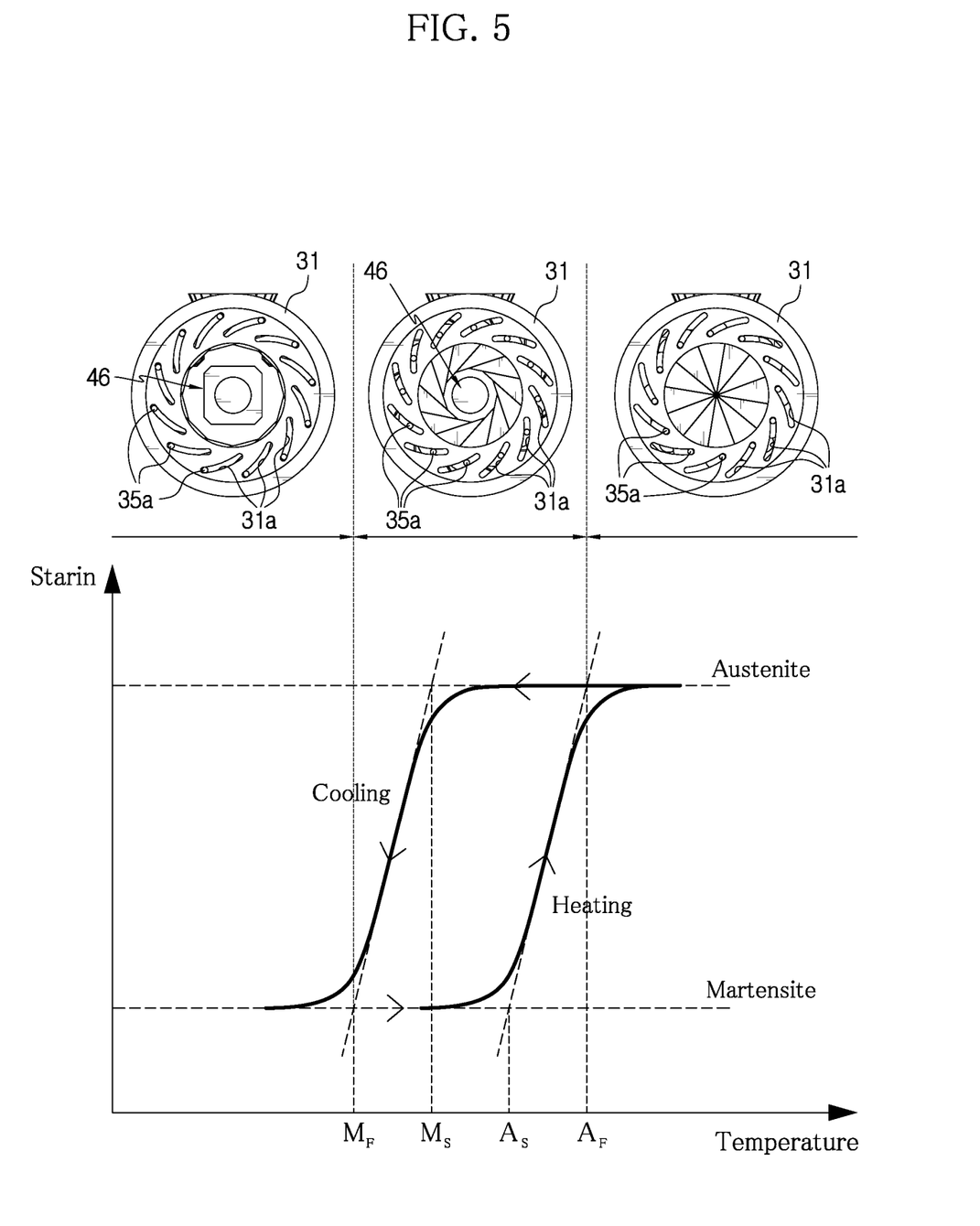
FIG. 5 is a graph showing a deformation amount of the deformable unit and the degree of opening or closing of the open portion by the shielding shutter depending on temperature.
Figure 6:
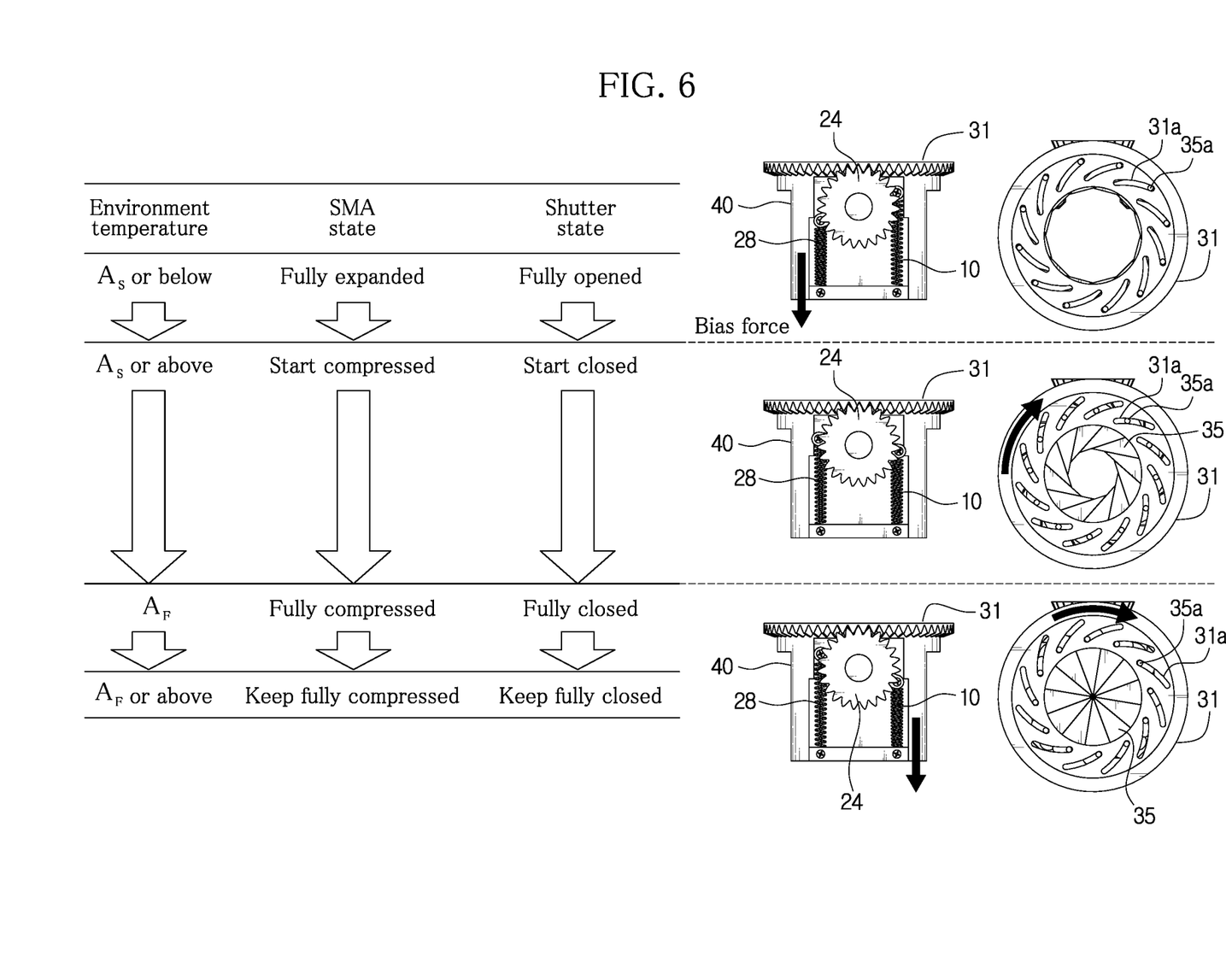
FIG. 6 is a diagram showing a deformation amount of the deformable unit and the degree of opening or closing of the open portion by the shielding shutter depending on temperature.

Referring to FIGS. 5 and 6, it is possible to check temperatures corresponding to the states of FIGS. 4A to 4C and resultant deformation amounts of the deformable unit 10.

If a high temperature is applied to the shielding device 100 since a fire or the like occurs, namely at a temperature $A_S$ in the graph, the deformable unit 10 starts being compressed, and if the temperature reaches temperature $A_F$, the deformable unit 10 is compressed to the maximum. At a temperature above the temperature $A_F$, as shown in FIG. 6, the deformable unit 10 is kept in its fully compressed state, and the open portion 42 is kept fully closed by the shielding unit.

After that, if the situation such as fire is terminated, the shielding device 100 may be cooled to a low temperature so that the compressed deformable unit 10 may be expanded. Here, the deformable unit 10 starts tensile deformation at the temperature Ms of FIG. 5, and the compressed deformable unit 10 is expanded to the maximum to restore the original shape of the deformable unit 10 if the temperature reaches the temperature MF.

In FIGS. 5 and 6, the temperature $A_F$ may be the first temperature described above, and the temperature MF may be the second temperature described above.

In the shielding device of the present disclosure, the shielding unit closes the open portion at high temperature as the deformable unit is activated, and the shielding unit opens the open portion at low temperature as the deformable unit is deactivated, thereby allowing the open portion to be opened and closed repeatedly.

In addition, in the shielding device of the present disclosure, the power generated by the deformation of the deformable unit can be transmitted to the shielding shutter through the first and second gear units so that the shielding shutter closes the open portion.

Meanwhile, in the shielding device of the present disclosure, the protrusion is guided by the slot hole of the shielding pivot unit so that the shielding shutter can open and close the open portion stably. In the shielding device of the present disclosure, the shielding shutter can stably open and close the open portion since the guide rib is guided by the guide groove of the shutter guide.

The shielding device 100 described above is not limited to the configurations and operations of the embodiments described above, but the embodiments can be modified in various ways by selectively combining all or some features of the embodiments.

It will be apparent to those skilled in the art that the present disclosure can be embodied in other specific forms without departing from the essential characteristics of the present disclosure. Accordingly, the above detailed description should be considered in all respects as illustrative and not restrictive. The scope of the present disclosure shall be determined by rational interpretation of the appended claims, and all changes within the equivalence scope of the present disclosure shall fall within the scope of the present disclosure.

What is claimed is:
1. A shielding device, comprising:
a casing having an open portion;
a deformable unit installed at the casing and configured to be deformed in one direction at a predetermined temperature;
a power transmission unit connected to the deformable unit to transmit a power generated by the deformation of the deformable unit; and
a shielding unit installed at the casing and connected to the power transmission unit to receive the power from the power transmission unit, the shielding unit being configured to open or close the open portion,
wherein the deformable unit is deformed at a first temperature to be expanded or compressed, and the shielding unit closes the open portion by means of the deformation of the deformable unit,
wherein the power transmission unit includes a first gear unit rotatably installed at one surface of the casing and disposed to intersect with a shielding pivot unit of the shielding unit, and wherein the first gear unit transmits the power generated by the deformation of the deformable unit to the shielding pivot unit so that the shielding pivot unit rotates.

2. The shielding device according to claim 1, wherein the deformable unit is a shape memory alloy.

3. The shielding device according to claim 1, wherein the deformable unit is deformed to be expanded at the first temperature, and
wherein the deformable unit is deformed to be compressed at a second temperature lower than the first temperature, and the open portion is closed by means of power generated when the deformable unit is compressed.

4. A shielding device, comprising:
a casing having an open portion;
a deformable unit installed at the casing and configured to be deformed in one direction at a predetermined temperature;
a power transmission unit connected to the deformable unit to transmit a power generated by the deformation of the deformable unit; and
a shielding unit installed at the casing and connected to the power transmission unit to receive the power from the power transmission unit, the shielding unit being configured to open or close the open portion,
wherein the deformable unit is deformed at a first temperature to be expanded or compressed, and the shielding unit closes the open portion by means of the deformation of the deformable unit, and
wherein the shielding unit includes:
a shielding pivot unit connected to the power transmission unit and having a plurality of slot holes spaced apart from each other in a circumferential direction and formed in directions intersecting with each other; and
a shielding shutter having a plurality of protrusions guided by the slot holes by means of the rotation of the shielding pivot unit and allowing the open portion to be opened or closed.

5. The shielding device according to claim 4, wherein the slot holes have an arc shape.

6. The shielding device according to claim 4, wherein the shielding shutter is provided in plural to be disposed along a circumferential direction,
wherein each of the shielding shutters has the protrusion, respectively, and
wherein in a state where the protrusions are guided by the plurality of slot holes, the plurality of shielding shutters are guided and moved by adjacent shielding shutters to close the open portion.

7. The shielding device according to claim 6, wherein the shielding unit further includes a shutter guide disposed between the shielding shutter and the casing to guide the shielding shutter so that the shielding shutter opens or closes the open portion.

8. The shielding device according to claim 7, wherein the shutter guide has a plurality of guide grooves disposed to be inclined at a predetermined angle and spaced apart from each other along a circumferential direction,
wherein the shielding shutter includes a guide rib inserted into the guide groove to be guided thereby, and
wherein the shielding shutter closes the open portion as the guide rib is guided in the guide groove.

9. The shielding device according to claim 4, wherein the power transmission unit includes a first gear unit rotatably installed at one surface of the casing and disposed to intersect with the shielding pivot unit,
wherein the shielding pivot unit includes a second gear unit formed along a circumferential direction to protrude at an edge of one surface thereof and engaged with the first gear unit, and
wherein the first gear unit transmits the power generated by the deformation of the deformable unit to the second gear unit so that the shielding pivot unit rotates.

10. The shielding device according to claim 9, wherein the power transmission unit further includes a rotator connected to the first gear unit to be pivotal together with the first gear unit and coupled to the deformable unit at one end thereof to rotate by means of the deformation of the deformable unit.

11. The shielding device according to claim 10, wherein the first gear unit and the rotator rotate based on a same rotary shaft.

12. The shielding device according to claim 10, wherein an elastic member is installed at another end of the rotator.

* * * * *